United States Patent [19]

Göransson et al.

[11] Patent Number: 5,437,791
[45] Date of Patent: Aug. 1, 1995

[54] METHOD FOR PURIFYING PROCESS WATER FROM PULP MANUFACTURE

[75] Inventors: Gunnar Göransson; Birgitta Sundblad, Göteborg; Johan Landfors, Sundsval; Hans Å. Baltsèn, Varberg, all of Sweden

[73] Assignee: Eka Nobel AB, Bohus, Sweden

[21] Appl. No.: 190,367

[22] Filed: Feb. 2, 1994

[30] Foreign Application Priority Data

Nov. 15, 1993 [SE] Sweden .................. 9303762

[51] Int. Cl.⁶ .................. C02F 1/56; B01D 1/00
[52] U.S. Cl. .................. 210/712; 210/724; 210/774; 210/928; 159/47.3; 162/42; 162/45
[58] Field of Search ........... 210/712, 713, 774, 928, 210/725, 727–731, 734–736, 723, 724; 162/29, 41, 42, 45; 159/47.1, 47.3

[56] References Cited

U.S. PATENT DOCUMENTS

| | | | |
|---|---|---|---|
| 2,218,053 | 10/1940 | Schwabe | 210/928 |
| 2,897,148 | 7/1959 | Laboureur | 210/928 |
| 3,141,816 | 7/1964 | Manley | 210/928 |
| 3,745,063 | 7/1973 | Fisher | 159/47.3 |
| 4,718,978 | 1/1988 | Spannuth et al. | 159/47.3 |
| 5,174,859 | 12/1992 | Rittof et al. | 210/774 |
| 5,230,808 | 7/1993 | Chung et al. | 210/928 |

FOREIGN PATENT DOCUMENTS

| | | |
|---|---|---|
| 1004782 | 2/1977 | Canada . |
| 2655504 | 10/1977 | Germany . |
| 60484 | 5/1975 | Japan .................. 210/928 |
| 8604975 | 5/1988 | Sweden . |
| WO87/07589 | 12/1987 | WIPO . |
| 8903911 | 5/1989 | WIPO .................. 210/928 |
| WO93/22243 | 11/1993 | WIPO . |

*Primary Examiner*—Neil McCarthy
*Attorney, Agent, or Firm*—Burns, Doane, Swecker & Mathis

[57] ABSTRACT

Process water from pulp manufacture is purified in a separator device by mechanical or a combination of mechanical and chemical methods and is thereafter evaporated, at least part of the concentrate resulting from the evaporation being recycled and mixed with the process water fed into the separator device. In a preferred embodiment, a precipitant is added to the mixed water comprising the process water and the concentrate. The part of the concentrate not recycled and mixed with the process water is supplied, optionally after further evaporation, with an acid to a pH of 1–5, whereupon resulting flocs and precipitates are removed in a separator device.

12 Claims, 1 Drawing Sheet

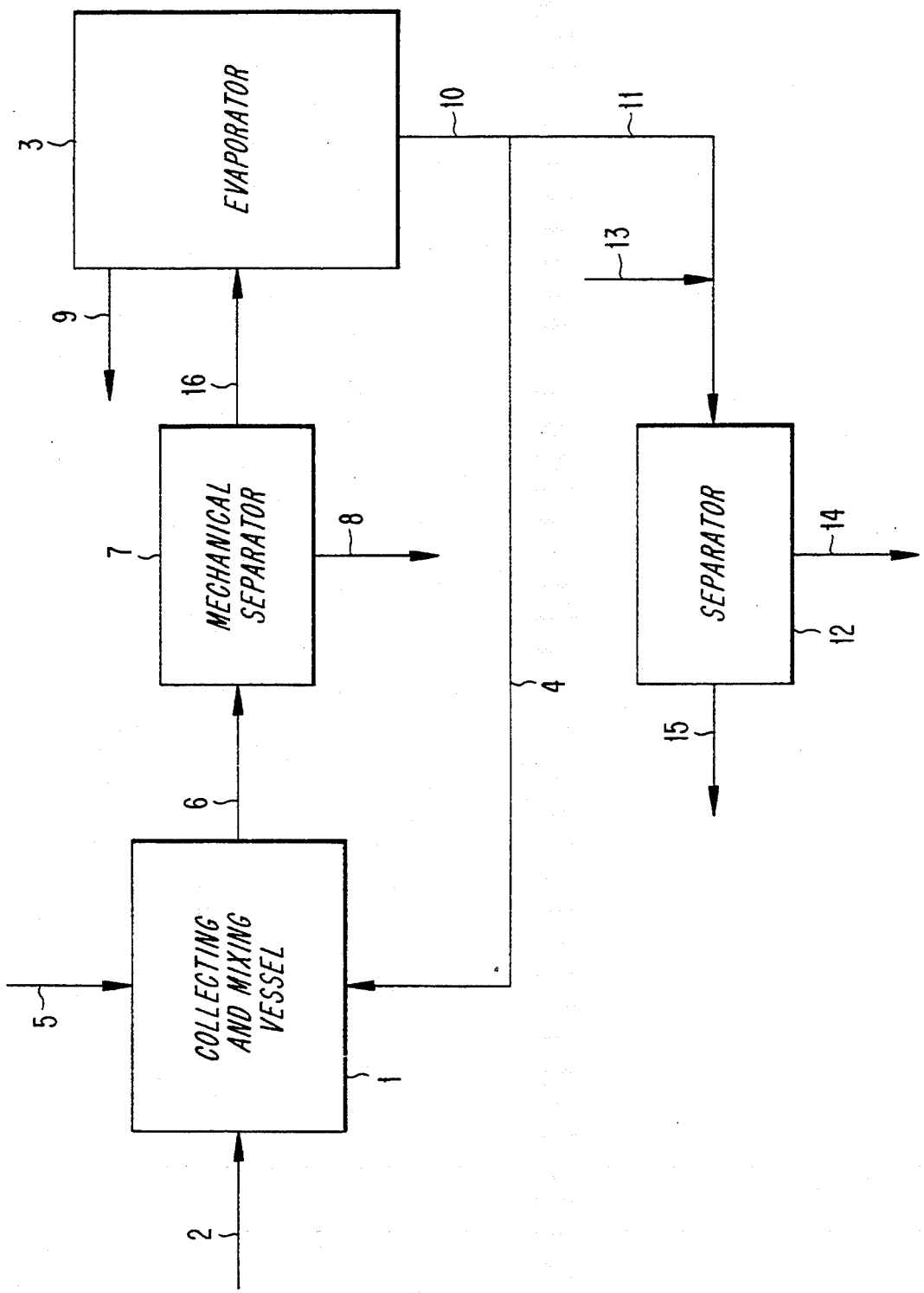

METHOD FOR PURIFYING PROCESS WATER FROM PULP MANUFACTURE

SUMMARY OF THE INVENTION

The present invention relates to a method for purifying process water from pulp manufacture by evaporating the process water and recycling a portion thereof to the incoming process water, and purifying the mixture, preferably in the presence of a precipitant.

Purification of process water from pulp manufacture is a common procedure. Apart from purely mechanical methods, such as screening, filtration, sedimentation and centrifugation, it is also possible to add a precipitant which flocculates or precipitates the impurities. The resulting precipitates or flocs can then be separated in conventional mechanical fashion or by flotation, e.g. microflotation.

With more stringent environmental demands, attempts have also been made to evaporate wastewater which had earlier been purified by mechanical methods or a combination of chemical and mechanical methods, with a view to concentrating the impurities. The contents of the process water thus treated mainly consist of salts, extractive substances and fibre fragments, so-called fines. The increase in concentration of suspended and dissolved substances that occurs in the evaporator has however been found in some cases to cause serious functional trouble because of the precipitation of inorganic salts and suspended organic agents in the evaporator.

One object of the present invention is to substantially reduce the problem of functional trouble in the evaporator.

Another object is to efficiently separate large amounts of dissolved and suspended substances from the process water.

Yet another object is to reduce the remaining volume as far as possible so as to cut the costs of the subsequent process steps.

It has now been found that these objects can be achieved by first purifying the process water from pulp manufacture in a separator device by mechanical and/or a combination of mechanical and chemical methods, and then evaporating it, at least part of the concentrate resulting from the evaporation being recycled and mixed with the process water fed into the separator device. Preferably, this mixed water comprising process water and concentrate is supplied with a precipitant. A suitable amount of precipitant is 0.5–50 ppm, based on the weight of the mixed water. By returning part of the concentrate from the evaporator it has surprisingly been found that a considerable amount of the impurities of the incoming process water can be separated along with the impurities of the concentrated process water. The degree of separation of suspended material in the mixed water becomes significantly higher than for the process water alone. It is especially noteworthy that the functional troubles in the evaporator are considerably reduced, which is probably due to a, relatively speaking, lower content of suspended organic matter. As a result, it becomes possible to also drive off more water so as to obtain higher dry solids contents than would otherwise have been possible. The dry solids content of the incoming process water generally is 0.01–1.5% by weight, preferably 0.1–1.0% by weight, while in the concentrate from the evaporator it generally is 1.0–50% by weight, preferably 2.0–15% by weight. The incoming process water can be evaporated to less than 50% of its original volume, suitably 25% and preferably 10% of its original volume.

Suitable precipitants are polyacrylamide, polyethylene oxide, starch derivative, phenol formaldehyde resin, polyamine resin, polyamide aminoepichlorohydrin resin, polydimethyl diallyl ammonium chloride, cellulose derivative, bentonire and salts of aluminium compounds, as well as mixtures thereof. Examples of such suitable precipitants are disclosed in patent publications SE 8604975-6, SE 9201398-6 and CA 1,004,782, which are hereby incorporated by reference. An especially preferred precipitant is a combination of polyethylene oxide having a molecular weight of 1,000,000–8,000,000 and a non-ionic cellulose ether.

The incoming process water generally has an approximately neutral or weakly alkaline pH, but after evaporation a pH of about 5.5–9.5 is obtained. This means that the mixed water will have a pH of about 6–9 and that it may be necessary to adjust the pH of the mixed water to obtain optimal conditions for precipitation and flocculation. Generally, precipitation and/or flocculation is carrier out at a pH of 7.5–8.5. The precipitants can be added directly on the feed conduit in one or more positions or in an appropriate mixing vessel equipped with an agitator. It is important that the mixing energy and the mixing time are so adapted as to yield optimal flocculation.

According to an embodiment of the invention, also part of the concentrate can be withdrawn for separate treatment by precipitation and flocculation. One way is to acidify the concentrate to a pH of 1–5, so that a portion of both organic and inorganic matter is precipitated. A suitable way of acidifying the concentrate is, for instance, to add sulphuric acid, hydrochloric acid, carbonic acid or phosphoric acid, or subject it to electrochemical treatment. Precipitation and flocculation can be further improved by adding a precipitant in an amount of 0.5–40 ppm, based on the weight of the concentrate. Examples of suitable precipitants are those indicated above. If so desired, the part of the concentrate that is withdrawn to be subjected to precipitation and flocculation in acid environment, can be further concentrated prior to this treatment in an evaporator which is especially adapted to the evaporation of concentrates having high salt contents.

BRIEF DESCRIPTION OF THE DRAWINGS

For a fuller understanding of the invention, the following detailed description should be read with reference to the drawing, wherein the FIGURE schematically shows a device suited for carrying out the method according to the invention.

DETAILED DESCRIPTION OF THE PREFERRED EMBODIMENTS

As shown in the FIGURE, incoming process water passes through the conduit 2 to a collecting and mixing vessel 1 where it is mixed with a concentrate supplied from an evaporator 3 through to a conduit 4. To the incoming process water can also be added a pH-adjusting agent and thereafter a precipitant through one or more separate conduits 5. The resulting mixture is passed through a conduit 6 to a mechanical separator device 7 for separating solid matter. Separated material is withdrawn through a conduit 8. Purified water from the separator device 7 is thereafter conducted through a conduit 6 to the evaporator 3, whence water distilled off is removed through a conduit 9. A concentrate is withdrawn through a conduit 10 and divided into two partial flows passing through a conduit 4 and a conduit 11. The latter partial flow is conducted to a separator device 12 for separating solid matter. Suitably, a pH-adjusting agent is first added and then a precipitant through one or more separate conduits 13. Precipated material and purified process water are withdrawn through conduits 14 and 15, respectively. If so desired, the concentrates passing through the conduit 11 can be further concentrated by evaporation before being supplied with pH-adjusting agent and precipitant and purified in the separator device 12.

The volume reduction thus leads to a surprisingly efficient purification and recovery of organic matter in combination with less functional trouble in connection with the precipitation and flocculation of organic matter and salts. Moreover, the volume reduction leads to a lower demand for precipitant. The clear phase obtained after the separation in acid environment can be subjected, completely or partly, to renewed evaporation, be used at a suitable point of the pulp process or be passed for recovery purposes to a chemical-recovery system. The precipitates and flocs obtained in the separation stages are suitably passed to an incinerator plant, for instance a soda recovery unit for recovering the energy content.

The invention will be further illustrated by the following Examples.

EXAMPLE 1

A process water coming from a bleach plant, containing 22 mg/l of suspended substances (according to SCAN-W 6:71), and having a content of organic matter of 2,100 mg/l $COD_{cr}$ and a dry solids content of 2.5 g/l, was mixed with 5% by volume of a concentrate. The concentrate had a content of suspended substances of 2,000 mg/l, a content of organic matter of 14,700 mg/l $COD_{cr}$ and a dry solids content of 17.5 g/l, and had been obtained by evaporating the process water to about 1/7 of its original volume. The mixed water had a content of 115 mg/l of suspended substances and a content of 2,700 mg/l $COD_{cr}$ and a pH of 7.9.

The mixed water and the process water were thereafter purified on a drum filter having a 500 mesh wire at 55° C. after varying additions of polyethylene oxide having a molecular weight of 4,500,000. The following results were obtained.

| Test | Water | REO ppm | Suspended substance percent by weight | Removed amount of suspended substance mg/l |
| --- | --- | --- | --- | --- |
| 1 | Process water | 0 | 65 | 14 |
| 2 |  | 2 | 77 | 17 |
| 3 |  | 4 | 84 | 18 |
| 4 | Mixed water | 0 | 81 | 93 |
| 5 |  | 2 | 90 | 104 |
| 6 |  | 4 | 95 | 109 |
| 7 |  | 6 | 96 | 110 |

From these results appears that the method according to the invention brings about an increased reduction of suspended substances, namely from 70-86% by weight in the process water to 81-95% by weight in the mixed water under otherwise equivalent conditions. Upon evaporation of the process water after purification according to Test 4, no disturbances appeared until the remaining volume was 7% of the original one, while in Test 1 problems appeared already at about 12% of the remaining volume.

EXAMPLE 2

The purified mixed water from the evaporator of Example 1 was evaporated to a volume of 10% compared with the original volume of the total amount of incoming process water. The temperature of the concentrate was adjusted to 40° C. and pH to 1, 2 or 3 with the aid of sulphuric acid. In some cases, precipitant was also added to further improve precipitation and flocculation, whereupon the precipitated material was separated by centrifugation. The following results were obtained.

| Test | pH | PEO ppm | CD[1] ppm | Reduction of $COD_{cr}$ % |
| --- | --- | --- | --- | --- |
| 8 | 3 | — | — | 7.6 |
| 9 | 2 | — | — | 33.9 |
| 10 | 1 | — | — | 41.5 |
| 11 | 3 | 5 | 10 | 41.5 |
| 12 | 3 | 2 | 2 | 39 |

[1]CD = Ethylhydroxyethyl cellulose

From these results appears that an essential part of the amount of organic matter could be removed by acidification.

EXAMPLE 3

Tests were carried out in accordance with Example 2, but with the difference that the concentrate was evaporated to a residual volume of 5% and no precipitants were added. The following results were obtained.

| Test | pH | Reduction of $COD_{cr}$ % |
| --- | --- | --- |
| 13 | 3 | 14.5 |
| 14 | 2 | 38.3 |
| 15 | 1 | 42.5 |

From these results appears that an essentially higher reduction was obtained because the concentrate had been evaporated to half the volume as compared with the concentrate of Example 2.

What is claimed is:

1. A method for purifying process water from pulp manufacture, comprising the steps of (a) purifying raw process water in a separator device by a process selected from the group consisting of mechanical and a combination of mechanical and chemical methods, (b) evaporating the process water purified in step (a), and (c) recycling at least part of the concentrate resulting from the evaporation in step (b) to an inlet to the separator device, said raw process water and purified process water forming a mixed stream at said inlet.

2. A method as claimed in claim 1, wherein the process water has a dry solids content of 0.01-1.5% by weight and the concentrate a dry solids content of 1.0-50% by weight.

3. A method as claimed in claim 1, wherein said purification is carried out in the presence of a precipitant added to said mixed stream.

4. A method as claimed in claim 3, wherein the precipitant is added in an amount of 0.5–50 ppm, based on the weight of the mixed stream.

5. A method as claimed in claim 1, including the step of acidifying a non-recycled portion of said concentrate, optionally after further evaporation, to a pH of 1–5, whereupon flocs and precipitates are formed and removed in a separator device.

6. A method as claimed in claim 5, wherein a precipitant is added during said acidification.

7. A method as claimed in claim 6, wherein the precipitant is added in an amount of 0.5–40 ppm, based on the weight of the concentrate.

8. A method as claimed in claim 3, wherein the precipitant added is selected from the group consisting of polyacrylamide, polyethylene oxide, starch derivative, phenol formaldehyde resin, polyamine resin, polyamide aminoepichlorohydrin resin, polydimethyl diallyl ammonium chloride, cellulose derivative, bentonite, salts of aluminum compounds, and mixtures thereof.

9. A method as claimed in claim 8, wherein the precipitant added is a combination of polyethylene oxide having a molecular weight of 1,000,000–8,000,000 and a non-ionic cellulose ether in a weight ratio of 2:1–1:10.

10. A method as claimed in claim 4, wherein the precipitant added is selected from the group consisting of polyacrylamide, polyethylene oxide, starch derivative, phenol formaldehyde resin, polyamine resin, polyamide aminoepichlorohydrin resin, polydimethyl diallyl ammonium chloride, cellulose derivative, bentonite, salts of aluminum compounds, and mixtures thereof.

11. A method as claimed in claim 6, wherein the precipitant added is selected from the group consisting of polyacrylamide, polyethylene oxide, starch derivative, phenol formaldehyde resin, polyamine resin, polyamide aminoepichlorohydrin resin, polydimethyl diallyl ammonium chloride, cellulose derivative, bentonite, salts of aluminum compounds, and mixtures thereof.

12. A method as claimed in claim 7, wherein the precipitant added is selected from the group consisting of polyacrylamide, polyethylene oxide, starch derivative, phenol formaldehyde resin, polyamine resin, polyamide aminoepichlorohydrin resin, polydimethyl diallyl ammonium chloride, cellulose derivative, bentonite, salts of aluminum compounds, and mixtures thereof.

* * * * *